(12) United States Patent
Rebmann et al.

(10) Patent No.: US 7,484,118 B2
(45) Date of Patent: Jan. 27, 2009

(54) MULTI NODAL COMPUTER SYSTEM AND METHOD FOR HANDLING CHECK STOPS IN THE MULTI NODAL COMPUTER SYSTEM

(75) Inventors: Karin Rebmann, Holzgerlingen (DE); Dietmar Schmunkamp, Schoenaich (DE); Tobias Webel, Schwaebisch-Gmuend (DE); Thomas E. Gilbert, Red Hook, NY (US); Timothy G. McNamara, Fishkill, NY (US); Patrick J. Meaney, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 11/013,728

(22) Filed: Dec. 16, 2004

(65) Prior Publication Data

US 2005/0149802 A1    Jul. 7, 2005

(30) Foreign Application Priority Data

Dec. 16, 2003    (EP)    ................................ 03104737

(51) Int. Cl.
*G06F 11/00* (2006.01)
(52) U.S. Cl. ...................................................... 714/13
(58) Field of Classification Search ................ 714/1–52
See application file for complete search history.

(56) References Cited

U.S. PATENT DOCUMENTS

| | | | |
|---|---|---|---|
| 4,396,995 A * | 8/1983 | Grau | 714/49 |
| 6,424,576 B1 * | 7/2002 | Antosh et al. | 365/189.05 |
| 2003/0131044 A1 * | 7/2003 | Nagendra et al. | 709/201 |
| 2005/0097381 A1 * | 5/2005 | Tsai | 713/400 |

OTHER PUBLICATIONS

IBM TDB, Jaber TK, Checkstop Architecture for a Multiprocessor System, Jan. 1991, IBM Technical Disclosure Bulletin, vol. 33 No. 8, pp. 321-323 http://www.ip.com/pubview/IPCOM000119334D.*

* cited by examiner

*Primary Examiner*—Scott T. Baderman
*Assistant Examiner*—Jigar Patel
(74) *Attorney, Agent, or Firm*—Arthur Ortega

(57) ABSTRACT

The present invention provides a new multi nodal computer system comprising a number of nodes on which chips of different types reside. The new multi nodal computer system is characterized in that there is one clock chip per node, each clock chip controlling only the chips residing on that node said chips being appropriate for sending a check stop request to the associated clock chip in case of a malfunction. A new check stop handling method is characterized in that depending on the source of the check stop request the clock chip that received the check stop request initiates a system check stop, a node check up, or a chip check stop.

3 Claims, 2 Drawing Sheets

MULTI NODAL COMPUTER SYSTEM AND METHOD FOR HANDLING CHECK STOPS IN THE MULTI NODAL COMPUTER SYSTEM

FIELD OF THE INVENTION

The invention relates in general to a multi nodal computer system comprising a number of nodes on which chips of different types reside. The invention relates further to a method for handling check stops in a multi nodal computer system.

BACKGROUND OF THE PRESENT INVENTION

A clock chip is the gate for a service interface into the system. The service interface sends commands to the clock chip and the clock chip provides the status of the entire system to the service element. The service interface consists of a service element (SE) which connects to a flexible service processor (FSP) via an Ethernet connection and the FSP connects to the clock chip via a proprietary interface. For reliability reasons there are two FSPs connected to the clock chip via two independent interfaces, but only one FSP may be active at a time, the other is in standby mode.

STATE OF THE ART

In prior art computer systems and methods for handling check stops in a computer system the clock chip is the central point of a hardware implemented run control structure. In case of a malfunction of any chip a system check stop is performed. In a system check stop all chips are stopped, not only malfunctioning chips but also functioning chips.

OBJECT OF THE PRESENT INVENTION

Starting from this, the object of the present invention is to provide a multi nodal computer system comprising a number of nodes on which chips of different types reside and a method for handling check stops in such a multi nodal computer system, avoiding the disadvantages of the prior art.

BRIEF SUMMARY OF THE INVENTION

The present invention provides a new multi nodal computer system comprising a number of nodes on which chips of different types reside and a new method for handling check stops in such a multi nodal computer system.

The new multi nodal computer system is characterized in that there is one clock chip per node, each clock chip controlling only the chips residing on that node, said chips being appropriate for sending a check stop request to the associated clock chip in case of a malfunction. The associated clock chip might stop only the chip that has sent the check stop request. The other chips of the local node and of the remote nodes might continue working.

A preferred embodiment of the multi nodal computer system is characterized in that there is a communication path between the clock chips of each node. The main purpose of the communication path is to exchange configuration information between the nodes. Thus each clock chip is still capable of providing system wide configuration information to the connected chips without having physical access to all chips. This hardware interface is much faster than a path via a service element, is readily available after power-on and occupies only a small number of pins.

A further preferred embodiment of the multi nodal computer system is characterized in that the topology of the communication path between the clock chips of each node is a star. Though the star topology requires more signal input-outputs than a ring topology the operation of a star structure is much easier, it is not necessary to pass thru commands from one clock chip via an intermediate clock chip to the target clock chip. The star structure also has advantages in systems that are not fully populated when one or more nodes are unplugged.

A further preferred embodiment of the multi nodal computer system is characterized in that each clock chip connects to each other clock chip with a 4 bit wide bus in each direction.

A further preferred embodiment of the multi nodal computer system is characterized in that each clock chip contains node operational registers for the local node. The node operational registers contain at least one bit per chip with information about the status of the corresponding chip. The node operational registers are updated by the corresponding clock chip for the local node.

A further preferred embodiment of the multi nodal computer system is characterized in that each clock chip contains node operational registers for the entire system. The node operational registers are updated by the clock chip to clock chip interfaces for the remote nodes.

The new check stop handling method is characterized in that depending on the source of the check stop request the clock chip that received the check stop request initiates a system check stop, a node check stop, or a chip check stop.

A preferred embodiment of the check stop handling method is characterized in that in case of a system check stop the connecting lines (start stop lines) to the remote nodes drop and the connecting lines (sync clock control lines) to the chips on the local node drop as well.

A further preferred embodiment of the check stop handling method is characterized in that the action on the local node is delayed in comparison with the remote nodes. Thus the entire system stops synchronously.

A further preferred embodiment of the check stop handling method is characterized in that the chips of each node comprise at least one processor unit chip and at least one cache chip, wherein the cache chips of all nodes are connected via a ring structure. The high speed interface between the cache chips of different nodes is used to maintain memory coherence.

A further preferred embodiment of the check stop handling method is characterized in that in case of a node check stop all processor unit chips of the local node are stopped, while the cache chips remain active. Thus the remote nodes can access the memory on the local node via the ring structure between the cache chips.

A further preferred embodiment of the check stop handling method is characterized in that once a clock chip has detected a chip check stop condition, it informs the other nodes in the system, which are kept running, about the event. A node check stop is handled as an equivalent to a multiple chip check stop.

A further preferred embodiment of the check stop handling method is characterized in that malfunction alert handling is done in two stages: local malfunction alert detection and global malfunction alert detection.

A further preferred embodiment of the check stop handling method is characterized in that the local malfunction alert detection comprises the following steps: a run control logic generates a local malfunction alert if it receives a check stop request from any processor unit chip core or MBA chip; the run control logic sends this malfunction alert condition to all clock chip to clock chip interfaces and to the node operational register for the local node. Normally the node operational registers for the local node are a shadow of the operational registers. If a suppress malfunction alert bit is set, the malfunction alert condition is not sent to the clock chip to clock chip interfaces and the update of the node operational register for the local node is suspended. In this case the operational register on node x and the node x operational register may contain different values.

A further preferred embodiment of the check stop handling method is characterized in that the node operational registers are updated by the clock chip to clock chip interfaces for remote nodes. The node operational registers are a shadow of the operational register on the local node. The update from remote nodes may be suspended by disabling the receiving part of the clock chip to clock chip interface for the remote node. The update from the local node may be suspended by setting the suppress malfunction alert bit.

Moreover, the invention relates to a computer program product stored in the internal memory of a digital computer, containing parts of software code to execute the above described method if the product is run on the computer.

BRIEF DESCRIPTION OF THE DRAWINGS

The above, as well as additional objectives, features and advantages of the present invention will be apparent in the following detailed written description.

The novel features of the present invention are set force in the appended claims. The invention itself, however, as well as a preferred mode of use, further objectives, and advantages thereof, will be best understood by reference to the following detailed description of an illustrative embodiment when read in conjunction with the accompanying drawings, wherein:

FIG. 1 shows schematically a multi nodal computer system comprising four nodes 1; 2; 3; 4 also referred to as books. Each book or node 1 to 4 includes a clock chip 10; 20; 30; 40. Each clock chip 10; 20; 30; 40 controls a number of chips 11, 12, 13, 14; 21, 22, 23, 24; 31, 32, 33, 34; 41, 42, 43, 44 of different types. The controlled chips comprise cache chips, MSC (Memory Storage Controller) chips, ETR (External Time Resource) chips and processor unit chips for example. There is a communication path 50 between the clock chips 10; 20; 30; 40 of each node 1 to 4. A clock chip 10 to 40 controls only the chips 11 to 14; 21 to 24; 31 to 34; 41 to 44 residing on the corresponding node 1; 2; 3; 4. Clock chips 10 to 40 operate independently from each other. Chips 11 to 14; 21 to 24; 31 to 34; 41 to 44 of each book 1; 2; 3; 4 communicate with memory units (MEM) 18; 28; 38; 48. Each chip 11 to 14; 21 to 24; 31 to 34; 41 to 44 can send a check stop request to the local clock chip 10; 20; 30; 40.

Figure 1:
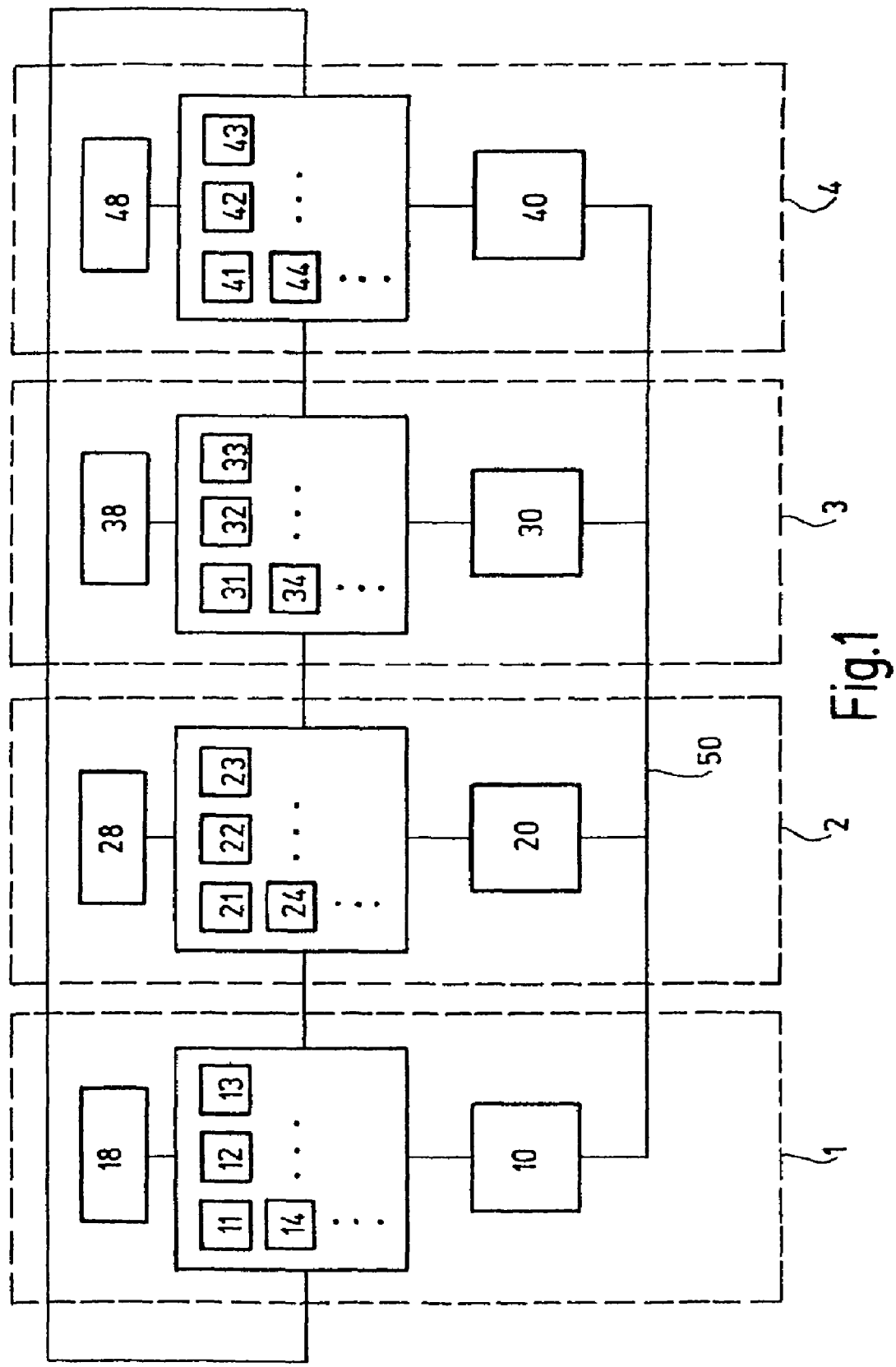
FIG. 1 shows a multi modal computer system according to the present invention and FIG. 2 shows a flow chart about malfunction alert handling according to the present invention.

Depending on the source of the check stop request clock chip 10 to 40 can take different actions: A system check stop, a node check stop or a chip check stop. Any check originating from a cache or MSC chip or from the ETR causes a system check stop. The start stop lines to the remote nodes drop and all sync clock control lines on the local node drop as well. If a control bit on the remote nodes is not set, the remote nodes drop their sync clock control lines. The action on the local node is delayed, thus the entire system stops synchronously. The local chip reports any chip check condition to its cage controller.

Each clock chip has four node control registers, three of them are used to control the behavior of the three remote nodes, the fourth for the local node remains unused. The control bit indicates that a particular remote node is unavailable or that this node does not control data which the local node wants to access. Thus normally this bit remains reset and may only be set during Initial Micro Load (IML) when the remote nodes do not have any data or in preparation for a concurrent repair action. The service element must make sure that the entire memory content has been relocated from that node prior to setting this bit.

A node check stop stops all processor unit chips and Memory Bus Adapt (MBA) chips on that node, while the cache chips, MSC chips and the ETR remain active. Thus the remote nodes can access the memory on the local node via the ring structure between the cache (L2) chips.

A node check stop request originates from the cache chip via another dedicated check line. The clock chip drops the sync clock control lines to all processor unit and MBA chips. The clock chip resets the operational bits for all processor unit and MBA chips. The further actions depend on the existence of a phantom PU. If a phantom PU is configured and started, the clock chip keeps the sync clock control lines to the cache and MSC chips active, otherwise the sync clock control lines and the start stop lines to the remote nodes drop as well and the result is the same as for a system check stop condition. The local clock chip reports any chip check condition to its cage (book) controller.

Any check originating from a processor unit core or an MBA causes a chip check stop. In case of an MBA chip the sync clock control line of the MBA drops and the operational bit for that MBA chip is reset. The MBA chip remains disabled. The cage controller may set the shift operation for the MBAs and shift out the data from that MBA chip. An option bit (stop all at any MBA check) allows escalating the chip check stop condition to a system check stop condition If the check originates from a processor unit core, the check indicators in check registers check A and check B identify the particular core. There is only one sync clock control line serving both cores on a physical chip. This line drops. The operational bits for both cores on that chip are reset. The physical chip gets disabled. The cage controller may set the shift operation bit for the processor units and shift out the data from the check stopped chip. An option bit (stop all at any processor unit check) allows escalating the chip check stop condition to either a node check stop or a system check stop condition. In any case the local clock chip reports any chip check condition to its cage controller.

Previous zSeries computer systems do not use several books and the clock chip is the central point of the hardware implemented run control structure. The clock chip is the gate for the service interface into the system. The service interface sends commands to the clock chip and the clock chip provides the status of the entire system to the service element. The service interface consists of a service element (SE) which connects to the flexible service processor (FSP) via an Ethernet connection and the FSP connects to the clock chip via a proprietary interface. For reliability reasons there are two FSPs connected to the clock chip via two independent interfaces, but only one FSP may be active at a time, the other is in standby mode. The new structure has a common SE, but dedicated FSPs per book and up to four books. Between the books there is a high-speed interface between the L2 (=cache) chips which is used to maintain memory coherence. The topology of the L2 interface is a ring. The L2 interface requires a calibration sequence in order to get operational. All other information must be routed via the SE under control of firmware.

In addition to these two communication paths there is a clock to clock interface. It does not require any calibration, thus it has a significantly lower bandwidth as the L2 interface. On the other hand side it is totally implanted in hardware and thus is much faster than the path via the SE. Its main purpose is to exchange configuration information between the books. Thus each clock chip is still capable of providing system wide configuration information to the connected processor units (Pus) without having physical access to all PUs. This hardware interface is much faster than the path via the SE, is readily available after power-on and occupies only a small number of pins. The topology of this interface is a star, each clock chip connects to each other clock chip with a 4 bit wide bus in each directions. Though the star topology requires more signal Input-Outputs (IOs) than a ring topology the operation of a star structure is much easier, it is not necessary to pass thru commands from one clock chip via an intermediate clock chip to the target clock chip. The star structure also has advantages in systems that are not fully populated when one or more books are unplugged.

In case of a PU check stop in a running system, the particular PU is disabled. Another PU may now shift out the data of the check stopped PU and put the data into main memory. A spare PU can take over the workload of the check stopped PU. The PU that shifts out the data from the check stopped PU may either be on the same book or on a different book. The read is non-destructive and the state of the PU is preserved during the shift operation. The shift engine supports a special skip command that rotates the data in the check stopped PU without a data transfer to the spare PU. Thus only relevant data is transferred into the spare PU, which optimizes the required time. After the spare PU has finished the sparing operation the check stopped PU can be analyzed by the FSP for the root cause of the check stop.

The ring interface between the L2 chips of different books requires a calibration and unfenced sequence. The ring interface can not be used prior to this calibration sequence, thus a PU can only communicate directly with a L2 on the same book. The clock chip provides a communication path to other books. A PU on book x starts the sequence by sending commands to the clock chips on books x and y. The clock chips propagate these commands to the L2 chips which initiate the calibration procedure.

Each book performs the reset function and the selftest independent from the other books under control of the local FSP. Nevertheless it is required to start the entire system synchronously. Due to the high total number of chips in the entire system, it is not possible to control all chips with only one clock chip. While with only one book and one FSP controlling it, all chips of the system started at the same time by default. Now each clock chip receives its start command independent from the other books, thus the entire system starts asynchronously if no provisions to synchronize the start commands. The software is not capable to send the start command to all books in the same processor cycle, thus the synchronization has to be done in hardware. There are point-to-point nets between all clock chips (same star structure as clock chip to clock chip interface) that indicate a local start condition of the clock chip. A local start does not yet start the clocks to the system, but only sends the 'armed' indication to the other clock chips. Each clock chip receives the 'armed' state from all other clock chips in the system and starts the local clocks if it itself is started and all 'armed' signals are active. The armed signals from the other clock chips have a defined delay, thus the internal start is delayed by the same amount of cycles. The last clock chip that indicates a local start starts the clocks to the entire system. All chips in the entire system start in the same cycle. The connection uses the same physical structure as the clock-to-clock interface and there is no dedicated master, it's a pure peer-to-peer connection. There is an option bit on each clock chip to disregard a specific 'armed' input from another clock chip. This is required to support systems that do not have the maximum number of books installed or to be able to start a particular book independently from the others (for debugging purposes).

Malfunction Alert Handling

Once the clock chip has detected a chip check stop condition, it informs the other nodes in the system, which are kept running, about the event. (Book check stop is equivalent to multiple chip check stop). The process of malfunction alert handling starts.

Malfunction alert handling is done in two stages: local malfunction alert detection and global malfunction alert detection.

Local Malfunction Alert Detection

The run control logic generates a local malfunction alert if it receives a check from any PU core or MBA chip. The run control logic sends this malfunction alert condition to all clock to clock interfaces and to the BOOK OPERATIONAL register for the local book. Normally the BOOK OPERATIONAL registers for the local book are a shadow of the OPERATIONAL registers. If the SUPPRESS MALFUNCTION ALERT bit is set, the malfunction alert condition is not send to the clock to clock interfaces and the update of the BOOK OPERATIONAL register for the local book is suspended. In this case the OPERATIONAL register on book x and the BOOK x OPERATIONAL register may contain different values.

Global Malfunction Alert Detection

Each clock chip maintains BOOK OPERATIONAL registers for the entire system. The BOOK OPERATIONAL registers are updated by the clock to clock interfaces for remote books and are a shadow of the OPERATIONAL register on the local book. The update from remote books may be suspended by disabling the receiving part of the clk2clk interface for the remote book. The update from the local book may be suspended by setting the SUPPRESS MALFUNCTION ALERT bit.

Figure 2:
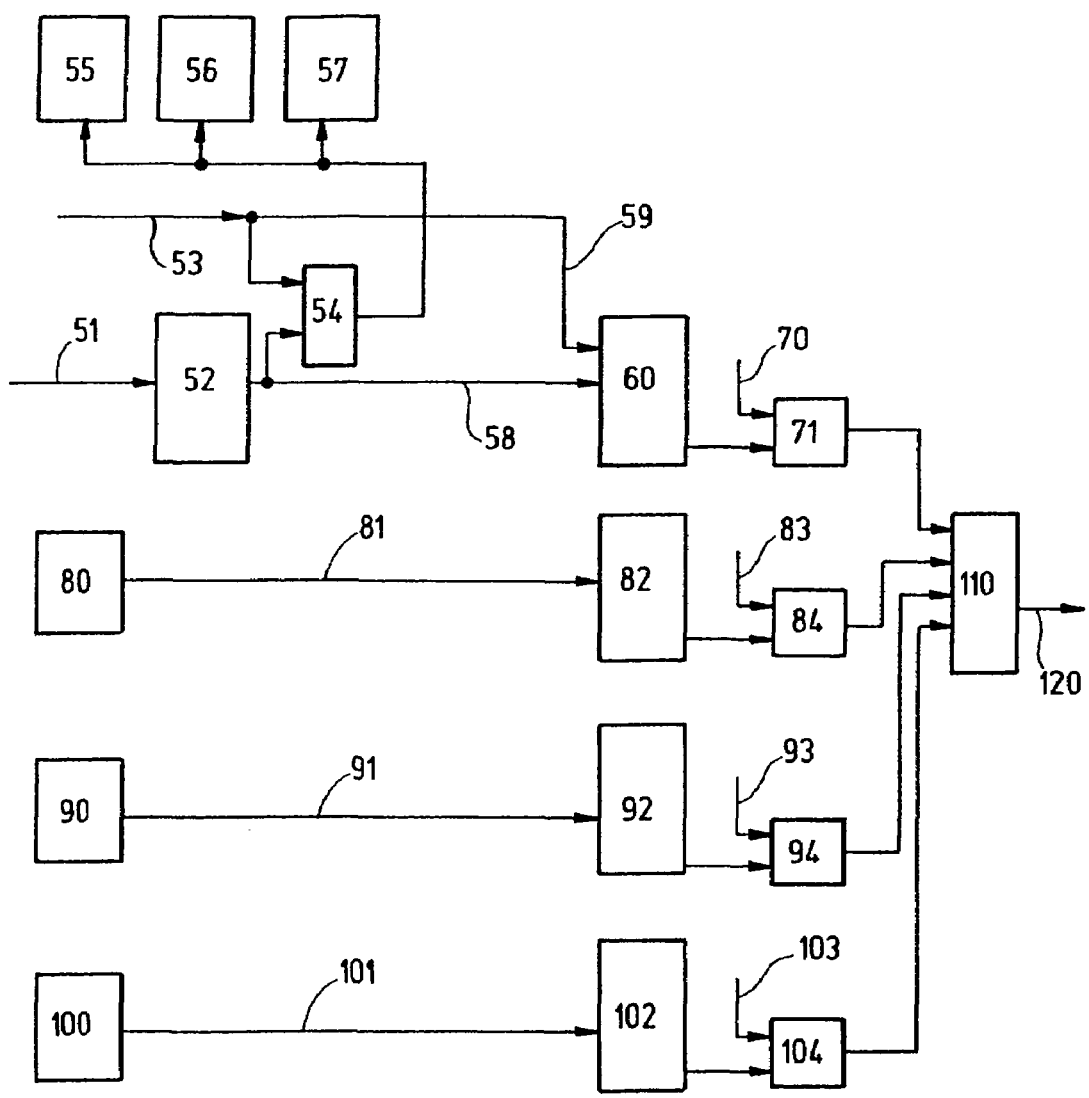

In FIG. 2, an Arrow 51 indicates that a node check stop or a chip check stop occurred in book 4 that corresponds to node 4. Block 52 shows a local operational malfunction detection. Arrow 53 indicates whether a malfunction alert is allowed. Block 54 contains an AND operation. If a malfunction alert is allowed, the corresponding information is sent from node 4 to nodes 1 to 3. Block 55, 56, 57 indicate that the corresponding information is transmitted over the clock to clock interfaces to nodes 1; 2; 3. Arrow 58 indicates that the information about the local operational malfunction detection 52 is transmitted to node operational malfunction detection block 60 of node 4. Arrow 70 indicates a node control bit of node 4. The control bit contains information whether it is allowed to send malfunction alert messages to processor unit chips. Block 71 contains an AND operation. Block 80, 90 and 100 indicate that nodes 1; 2; 3 receive the information about the local operational malfunction detection in node 4 over the clock chip to clock chip interfaces. Arrow 81, 91, 101 indicate that the corresponding data and updates are transmitted to node operational malfunction detection blocks 82, 92 102 of nodes 1, 2, 3. Arrow 83, 93, 103 indicate that the corresponding node control bits are regarded. Block 110 contains an OR operation. Arrow 120 indicates that a global malfunction alert is sent to all clock chips and other chips.

The invention claimed is:

1. In a multi nodal computer system comprising a plurality of nodes each of which includes chips of different types, wherein one of said chips on each node is a clock chip which is connected to the other chips included on that node via a local communication path and is central to the other chips on that node, the clock chip is capable of providing a clock signal for synchronizing the other chips on the node, a system communication path connects the clock chips on each node, and wherein the other chips on each node are capable of sending a check stop request to the clock chip on their node in case of a malfunction, and the clock chip is capable of selectively disabling one or more chips that caused a malfunction on the node, a method for handling check stops comprising:

initiating a check stop by a clock chip depending on a source of a check stop request, wherein said check stop is selected from a group including: a system check stop, a node check stop, and a chip check stop;

in case of a system check stop the system communication path drops and the local communication path drops, wherein the local communication path drops after a delay following the system communication path drop;

in case of a node check stop all processor unit chips of the node are stopped while all cache chips remain active; and in case of a chip check stop, communicating to other nodes over the system communication path, which continue running, about the chip check stop, and in case the chip check stop is received from a processor unit chip or a Memory Bus Adapt (MBA) chip of a first node, shifting out data from the MBS chip and the processor unit chip into main memory of the first node, processing the shifted out data by a processor unit chip of a second node, and escalating the chip check stop condition to a system check stop condition.

2. Method according to claim 1, further comprising:

run control logic generating a malfunction alert if it receives a check stop request from a processor unit chip or a Memory Bus Adapt (MBA) chip; and the run control logic sending the malfunction alert to other clock chips and to a node operational register on its node.

3. Method according to claim 2, further comprising:

updating node operational registers on remote nodes in response to their clock chip receiving the malfunction alert.

* * * * *